United States Patent [19]

Megahed et al.

[11] Patent Number: 5,246,795
[45] Date of Patent: Sep. 21, 1993

[54] HIGH TEMPERATURE LITHIUM SOLID CATHODE ELECTROCHEMICAL CELLS

[75] Inventors: El-Sayed Megahed, Madison; Ralph H. Feldhake, Verona; Robert J. Bosben, Madison; Daniel Rohde, Middleton; James L. Lautzenhiser, Combined Locks, all of Wis.

[73] Assignee: Rayovac Corporation, Madison, Wis.

[21] Appl. No.: 738,308

[22] Filed: Jul. 31, 1991

[51] Int. Cl.$^5$ .................................................. H01M 2/08
[52] U.S. Cl. ..................................... 429/185; 429/197
[58] Field of Search ........................... 429/171–174, 429/185, 197

[56] References Cited

U.S. PATENT DOCUMENTS

| | | | |
|---|---|---|---|
| 3,877,992 | 4/1975 | Urry | 429/171 X |
| 4,248,946 | 2/1981 | Malachesky | 429/197 |
| 4,560,630 | 12/1985 | Salomon et al. | 429/197 X |

OTHER PUBLICATIONS

Patent Abstracts of Japan, No. 58-112246, Jul., 1983, Tanaka (E 201, p. 21).
Patent Abstracts of Japan, No. 59-78443, May 1984, Kizawa (E263, p. 8).
Patent Abstracts of Japan, No. 60-147721, Aug. 1985 Nishida (F 413, p. 136).

*Primary Examiner*—Stephen Kalafut
*Attorney, Agent, or Firm*—Kenyon & Kenyon

[57] ABSTRACT

A lithium carbon monoflouride electrochemical cell adapted for high temperature use and storage. The high temperature capability is provided by incorporating into such cells novel components such as a polyetheretherketone grommet, a single layer non-woven glass fiber separator, a sealant which contains up to fifteen percent, by weight, silicone, and an electrolyte which contains an increased proportion of propylene carbonate. For temperatures above 180° C., the metal lithium anode conventionally used in LiCF$_x$ cells may be replaced by a lithium-alloy material.

10 Claims, 4 Drawing Sheets

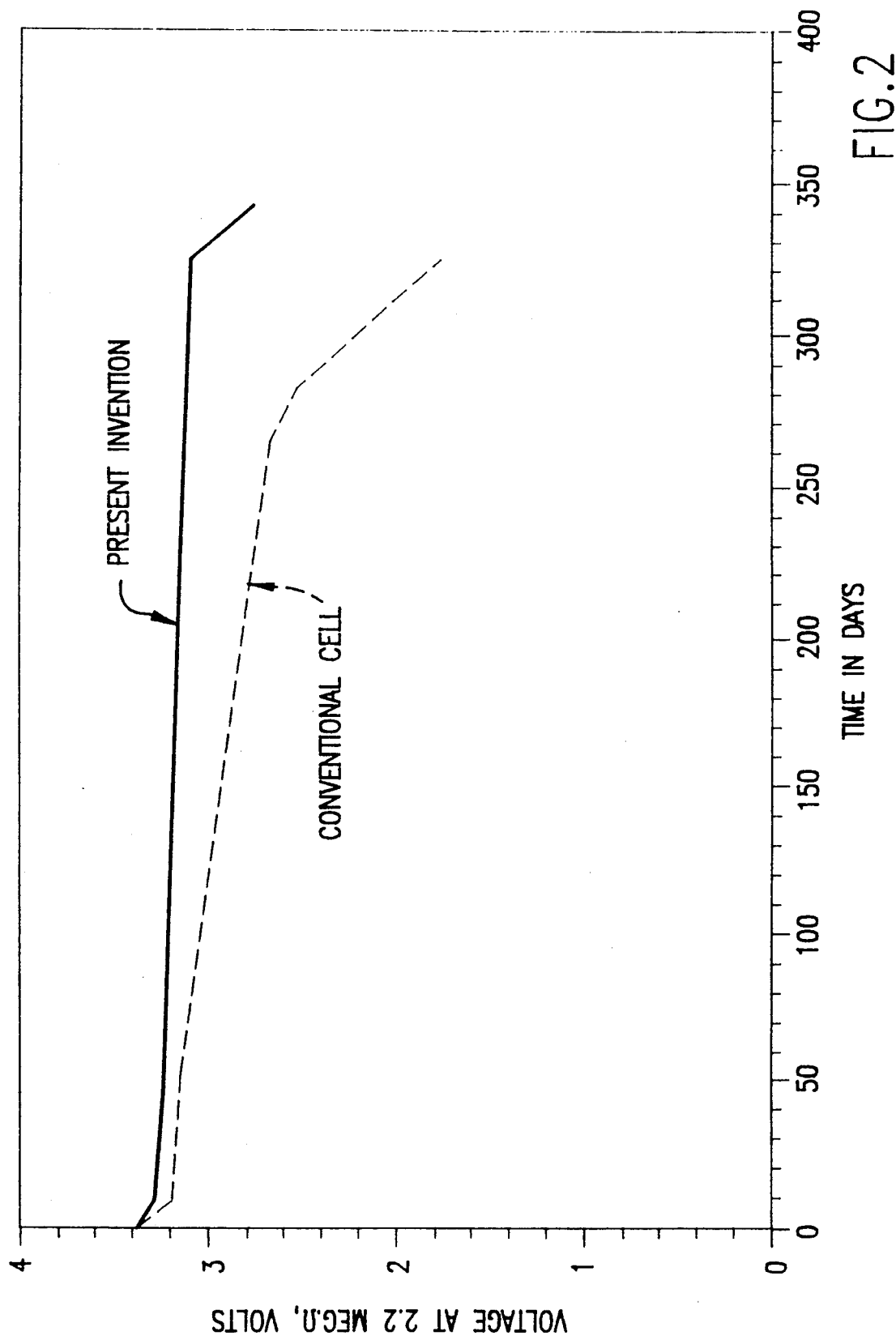

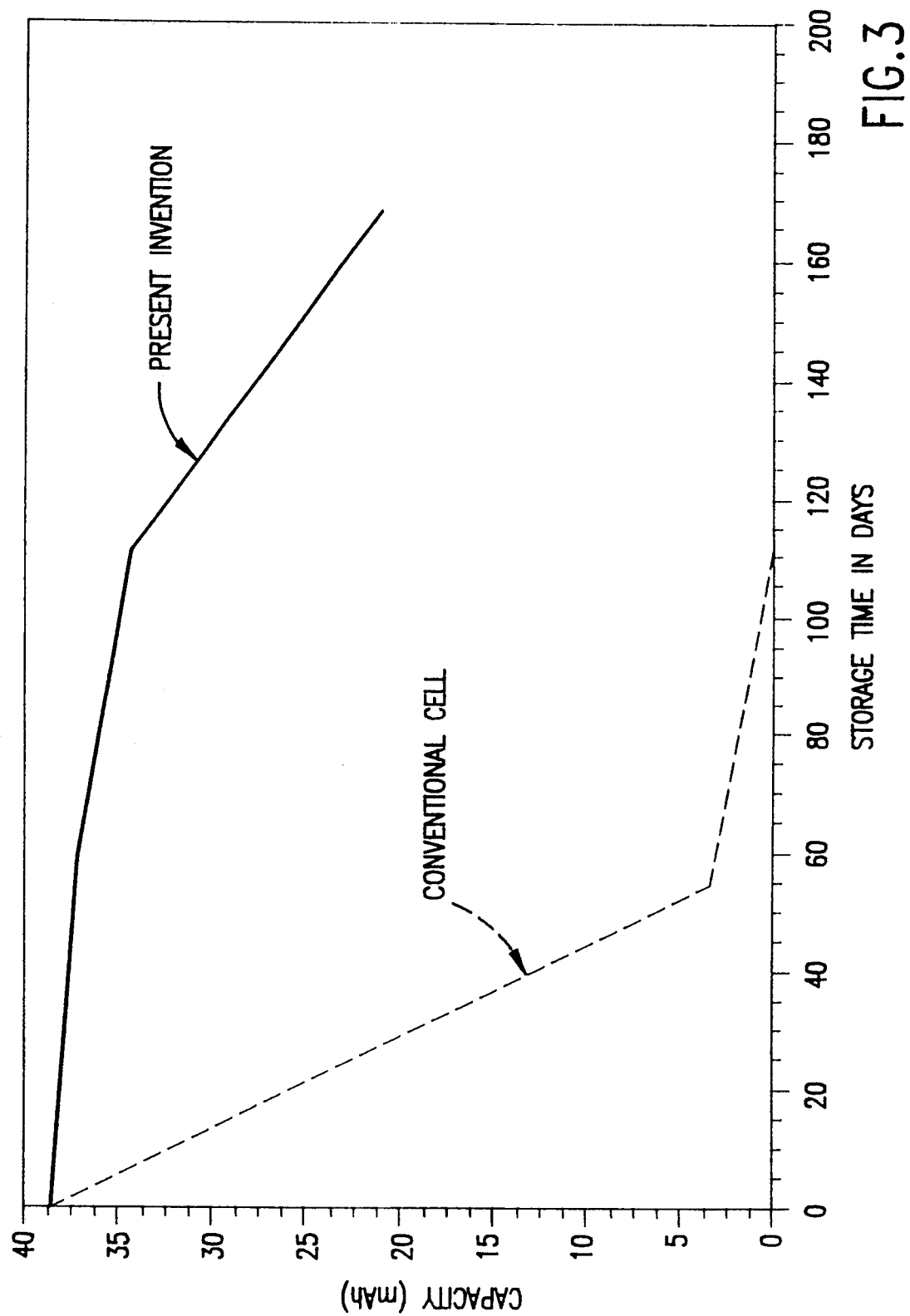

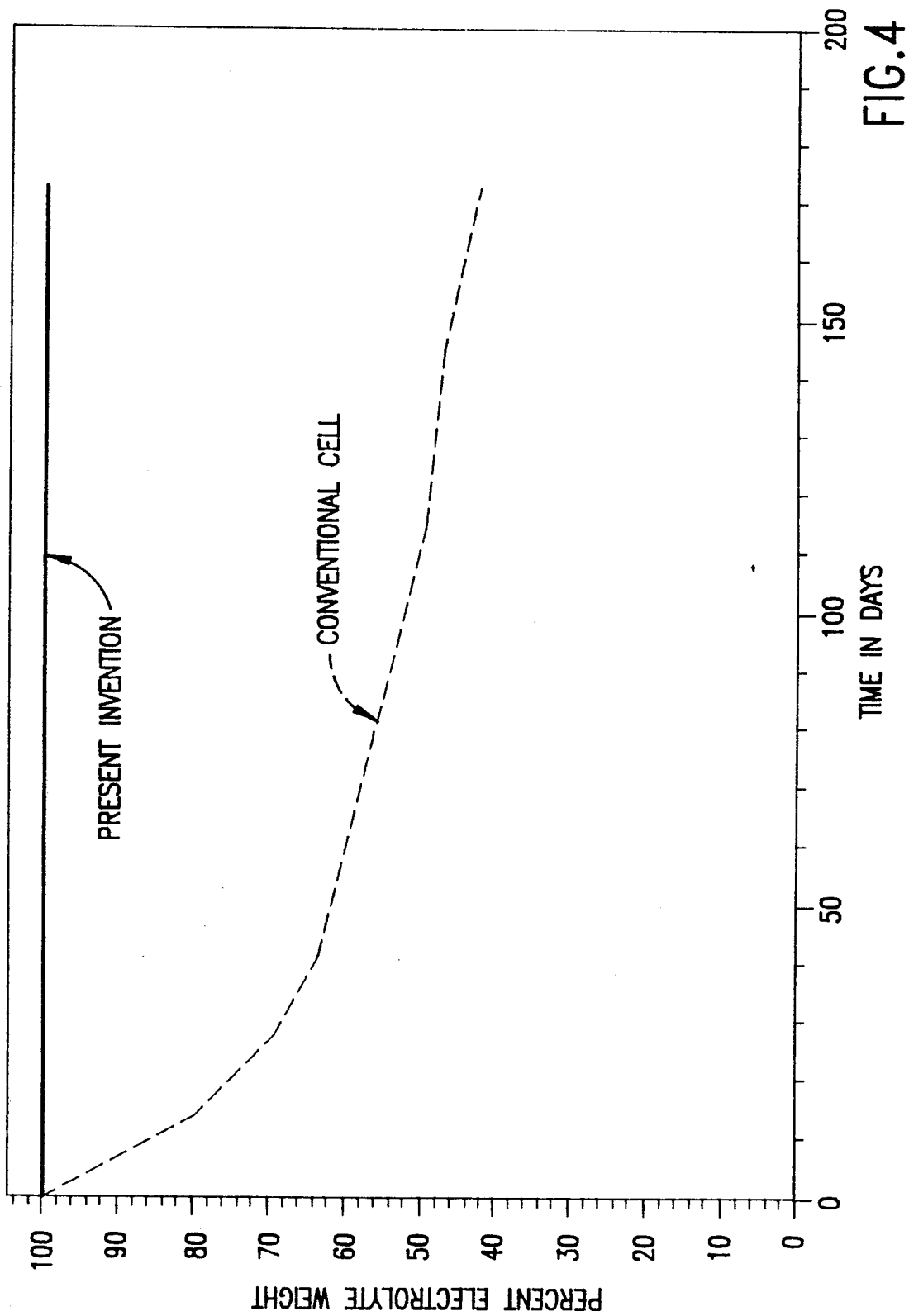

HIGH TEMPERATURE LITHIUM SOLID CATHODE ELECTROCHEMICAL CELLS

FIELD OF THE INVENTION

The present invention relates to the construction small electrochemical cells. In particular, the present invention relates to the construction of small electrochemical cells having solid cathodes adapted for use in high temperature environments, and more particularly to such small lithium/carbon monofluoride electrochemical cells.

BACKGROUND OF THE INVENTION

The recent increase in small electrically-powered devices has increased the demand for very small electrochemical cells, usually disc-like or pellet-like in appearance, commonly referred to as a coin cell. Such cells, which are approximately the size of garment buttons, have diameters ranging up to about 1.0 inch and heights ranging up to about 0.60 inches. Because of their minute size, the power generating electrochemical reactions in button cells must be efficient and complete. Additionally, button cells must be manufactured with substantial precision to meet the geometric tolerances of the electrical device to avoid leakage of corrosive electrolytes.

For many such applications, the electrochemical cells of choice is lithium carbon monoflouride (Li/$CF_x$) coin cells. These electrochemical cells are comprised of lithium anodes, carbon monofluoride cathodes and a electrolyte, usually a lithium salt. However, the use of $LiCF_x$ cells is limited by storage and use temperatures, i.e. cell performance deteriorates when the cells are stored at elevated temperatures above 60° C. or used for extended periods at temperatures of 100° C. or more. The deterioration of cell performance is unrelated to the fundamental electrochemical couple, which is capable of up to 181° C. for the lithium and 450°–650° C. for the carbon monofluoride. Moreover, in characterizing carbon monofluoride using a differential thermal analysis, it was determined that the lithium fluoride (LiF) discharge product is stable in the carbon monofluoride at cathode temperatures up to 850° C.

Typically lithium carbon monofluoride electrochemical cells are stored at temperature from −20° C. to +60° C. When stored at higher temperatures cell performance can be affected due to problems with three cell components—the seal, the separator, and the electrolyte. The seals of Li/$CF_x$ electrochemical coin cells are comprised of a polyolefin, usually polypropylene, grommet and a sealant. Any alteration of the grommet after the electrochemical cell has been manufactured will have a detrimental effect on the electrical and physical characteristics of the cell. Under conditions of high thermal stress, e.g., 125° C., polypropylene has a tendency to flow and/or oxidize. Further, the oxidation reaction can be accelerated by the solvents of the electrolyte. When polypropylene grommets begin to flow, the compression crimp seals reduced, which in turn results in the electrical degeneration of the cell. In addition to sealing the electrochemical cell the polypropylene grommet controls the egress and ingress of water vapor to the cell as a function of the ambient humidity. In $LiCF_x$ electrochemical cells, the sealant is applied to the grommet to fill voids and irregularities between the grommet and the metal can and top of the cell. The prevalent sealant today is a bituminous solution, which has a low degree of thermal stability and tends to flow when subjected to extended periods of elevated temperatures. Such flow of the bitumen sealant can destroy the seal integrity, resulting in a change in the concentration of the electrolyte, which can result in a capacity degeneration.

The separator in $LiCF_x$ cells, typically made of non-woven polyproylene, acts as a mechanical cushion as well as an insulator between the anode and cathode. The separator also serves as the electrolyte absorbent necessary to maintain the desired ionic conductivity in the cell. Under conditions of extended high temperature storage, e.g., 125° C. or higher, standard non-woven polypropylene tends to shrink. And because the polypropylene begins to melt at 150° C., separators in $LiCF_x$ cells can melt when such cells are stored or used at high temperatures. Of course, melt down of the separator results in the irreversal degradation of the cell.

The electrolyte of a $LiCF_x$ cell is the cell's ionic conductor. Generally, in the lithium/carbon monofluoride cell chemistry, a lithium tetrafluoroborate ($LiBF_4$) salt in 50/50 volumetric solution of propylene carbonate (PC) and dimethoxyetethane (DME) is used as the electrolyte. DME is highly volatile and, during use or storage at high temperatures of 125° C. or more, can diffuse around and through the seal, which causes an increase in cell impedance and electrical degradation. At temperatures of 200° C. or more, the propylene carbonate will decompose and/or an interact with the lithium tetrafluoroborate salt, causing the electrical degradation of the cell.

Accordingly, it is an object of the present invention to provide for a lithium carbon monoflouride electrochemical cell which may be stored and/or used for extended periods at high temperatures.

Still another object of the present invention is to provide for a high temperature lithium solid cathode cell which can be constructed according to known manufacturing techniques.

The above objects of the present invention will be more fully understood, and further objects and advantages will become apparent, from the following description of the invention.

SUMMARY OF THE INVENTION

The present invention related to a lithium carbon monofluoride electrochemical coin cells which are particularly adapted for storage and use at high temperatures. To function at high temperatures, the electrochemical cells of the present invention are comprised of novel grommets, separators, electrolytes and sealants. The grommets of the present are made of polyeheretherketone, instead of polypropylene, while a single layer of non-woven glass fiber is the preferred separator, replacing a double layer of non-woven polypropylene. The electrolyte of the coin cells of the present invention is 0.85 moles of $LiBF_4$ salt per liter of mixed solvents consisting of a 70/30 volumetric ratio of either propylene carbonate and dimethoxyethane or gammabutyrolacetone acetone and dimethoxyethane and the sealant, while mostly bitumen, contains up to 15% by weight of silicone rubber. For cells which function at extreme high temperatures, the metal lithium anode can be replaced with a lithiated alloy.

BRIEF DESCRIPTION OF THE DRAWINGS

FIG. 2 is a graph illustrating the high resistive load capabilities at 125° C. of conventional lithium carbon monoflouride electrochemical cells and lithium carbon monoflouride electrochemical cell of the present invention.

FIG. 3 is a graph illustrating the capacity retention of conventional lithium carbon monoflouride electrochemical cells and lithium carbon monoflouride electrochemical cell of the present invention following storage at a 125° C.

FIG. 4 is a graph illustrating the change in cell electrolyte weight conventional lithium carbon monoflouride electrochemical cells and lithium carbon monoflouride electrochemical cell of the present invention during storage at 125° C.

DETAILED DESCRIPTION OF THE INVENTION

Figure 1:
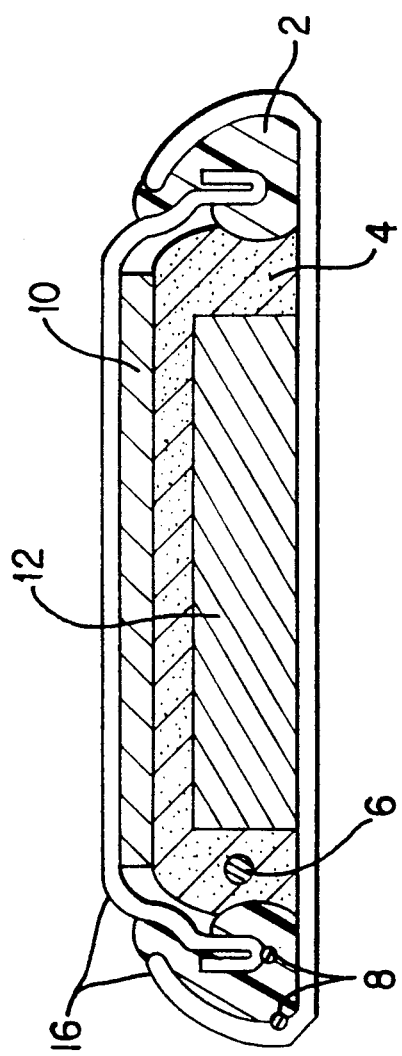
FIG. 1 shows the construction of conventional lithium carbon monoflouride electrochemical cells and cells of the present invention.

While the present invention is applicable to all types of crimp sealed, organic electrolyte cells, the invention will be described in terms of a lithium/carbon monofluoride button cell. In general, the high temperature solid cathode electrochemical cell disclosed in the present invention may be stored at temperatures ranging from $-20°$ C. to $125°$ C. And although the lithium anode of cells of the present invention are the same as prior art lithium/carbon monofluoride cells, a lithium-alloy should be incorporated if prolonged exposure to temperatures above $180°$ C. is contemplated.

Referring to FIG. 1, the grommet 2 of the electrochemical cells of the present invention is a polyetheretherketone (PEEK), a semi-crystalline thermoplastic with a melting point above $200°$ C. Based upon its ability to flow into a thin walled injection molded part, the preferred grommet material is 150 G grade PEEK. For use in the present invention, this grade of PEEK must have a moisture content of less than 0.1% which usually requires drying in an air circulating oven for a minimum of three hours at $150°$ C. 150 G grade polyetheretherketone prevents cold flow of the seal of the coin cell at $125°$ C., while maintaining a low water absorption rate of approximately 0.5% per 24 hours. Other thermoplastics and thermosets contemplated by the present invention are either at least 40% crystalline and have a melting point above $150°$ C., or are chemically inert, amorphous thermoplastics or thermosets with a melting point and a residual modulus at or above $150°$ C., in order to prevent cold flowing at the desired temperature storage. The 150 G grade PEEK can be molded in its amorphous state in a four cavity fully automatic type 101 mold which incorporates #420 stainless steel cavities and cores, and a hot sprue bushing for increased mold efficiency and longevity. In an embodiment, fabrication of the grommet of the present invention may require double gated mold cavities to assist in the integral filling of each cavity. However, the use of single gated mold cavities is comtemplated by the present invention. Each of the mold cavity gates can be located on the inside diameter of the grommet, which eliminates the possibility of complications with the seal integrity. In the construction of prior art $LiCF_x$ coin cells, the gating had been placed on the outside diameter for an increased gate size. The smaller, gate, in combination with the injection moldable 150 G grade PEEK, material allows the grommet to be a uniform and consistent seal component.

The sealant 8 used in coin cells of the present invention are comprised of a major amount of bitumen and minor amount of mineral oil. However, up to 15% by weight of silicone rubber is added to reduce the sealant reflow characteristics. In prior art $LiCF_x$ coin cells, i.e., those without silicone in the bitumen solution, the sealant flows externally over the crimped surface of the cell can and top 16 and internally into the separator and/or over the metallic lithium surface. This reflow of sealant degrades the physical and electrical characteristics of the coin cell. While pure silicone rubber sealants often have high viscosities, which complicates the uniform application of this material to the narrow grommet sealant channel, such sealants can be adapted for use in the present invention. The mixture of bitumen and silicone rubber allows the sealant to retain its requisite physical attributes at elevated temperatures, while maintaining a viscosity low enough for the precision application of sealant into the narrow grommet channel.

The separator 4, between the anode 10 and the cathode 12, of the coin cells of the present invention are non-woven glass. Such glass separators combine excellent chemical resistance with outstanding thermal stability. However, the glass used in the separators must contain, at most, only very small amounts of contaminants such as iron, calcium and strontium. Trace amounts of iron have been observed to be particularly harmful when cells of the present invention are stored for extended periods at elevated temperatures, since it tends to react with internal cell components which eventually results in a total cell electrical performance failure. In addition to having low levels of contaminants, separators for the present invention must possess sufficient tensional and shear strengths to survive the manufacturing process intact, including cutting, cupping and placement into the cell. If the separator becomes torn during any of those manufacturing steps, both physical and electrical characteristics of the cell will degrade. For example, a tear during the cupping or placement steps can result in an internal short. Therefore, in some instances, up to 7% of a binder is added to the separator to improve its handling characteristics. However, the use of binders in the high temperature environments is not recommended, since binders may decompose and/or react with various cell components.

The preferred electrolyte 6 of the coin cells of the present invention is 0.85 moles of $LiBF_4$ salt per liter of mixed solvents consisting of a 70/30 volumetric ratio of propylene carbonate and dimethoxyethane. By increasing the volumetric percentage of propylene carbonate, the amount of the more volatile dimethoxyethane component is reduced, thereby lessening the possibility of the cell to drying out. Since the propylene carbonate can decompose or react with the lithium tetrafluoroborate salt, thereby causing the electrical degradation of the cell, when coin cells will be used or stored at temperatures greater than $200°$ C., 0.85 moles of $LiBF_4$ salt per liter of mixed solvents consisting of a 70/30 volumetric ratio of gammabutyrolacetone and can be used. An alternative to the preferred lithium tetrafluoroborate salt is a 1 molar concentration of lithium perfluoroalkanesulfonimide $((CF_3SO_2)_2NLi)$ salt in either a 70/30 volumetric ratio of propylene carbonate and dimethoxyethane, or a 70/30 volumetric ratio of gammabutyrolacetone and dimethoxyethane.

Experimental Results

Conventional Rayovac Corporation BR1225 lithium/carbon monoflouride coin cells were compared to BR1225 size lithum/carbon monflouride cells of the present invention. FIG. 2 compares the resistive load capacitiies of the both types of cells stored at 125° C. While the cell voltage of cells for present invention under a 2.2 mega ohm load is always superior to prior art cells, the difference increases with the duration of storage.

FIG. 3 compares the 15K ohm discharge of prior art cells and cells of the present invention following storage at 125° C. The superiority of the cells of the present invention is obvious- after thirty days the capacity of prior art cells has declined by 50% versus an approximate 2.5% decline for cells for the present invention. Moreover, the prior art cells are completely dead after 110 days, while the cells for the present invention still retain about 87% of their initial capacity.

FIG. 4 shows that cells constructed to the present invention are unaffected by storage at high temperatures. While prior art cells lose about 50% of their electrolyte weight after storage for 100 days at 125° C., the cells for the present invention show no loss in electrolyte weight.

From the foregoing, those skilled in the art will realize that various modifications in the above described compositions and methods can be made without departing from the spirit and scope of the invention. Accordingly the invention may be embodied in other specific characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to embraced therein.

What is claimed is:

1. A lithium carbon monoflouride electrochemical cell particularly adapted for storage and use at high temperatures having a polyetheretherketone grommet, a chemically inert separator having thermal stability at 125° C., 0.85M LiBF$_4$ salts as the electrolyte and a sealant comprised of bitumen and silicone rubber.

2. The electrochemical cell of claim 1, wherein the chemically inert separator is a single layer of non-woven glass fiber.

3. The electrochemical cell of claim 1, wherein the electrolyte solvent consists of at least 60% propylene carbonate and dimethoxyethane.

4. The electrochemical cell of claim 1, wherein the electrolyte solvent consists of at least 60% gammabutyrolacetone and dimethoxyethane.

5. The electrochemical cell of claim 1, wherein the sealant contains up to 15% by weight silicone.

6. An non-aqueous electrochemical cell comprised of a solid cathode, said electrochemical cell having a polyetheretherketone grommet, a chemically inert separator having thermal stability at 125° C., 0.85M LiBF$_4$ salts as the electrolyte and a sealant comprised of bitumen and silicone rubber.

7. The electrochemical cell of claim 8, wherein the chemically inert separator is a single layer of non-woven glass fiber.

8. The electrochemical cell of claim 8, wherein the electrolyte solvent consists of at least 60% propylene carbonate and dimethoxyethane.

9. The electrochemical cell of claim 8, wherein the electrolyte solvent consists of at least 60% gammabutyrolacetone and dimethoxyethane.

10. The electrochemical cell of claim 8, wherein the sealant contains up to 15% by weight silicone.

* * * * *